United States Patent
Tuma et al.

(10) Patent No.: US 8,585,442 B2
(45) Date of Patent: Nov. 19, 2013

(54) EXPANSION CARD ADAPTER

(75) Inventors: George Tuma, San Jose, CA (US);
Samuel Chau, Cupertino, CA (US);
Karl R. Hassur, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 138 days.

(21) Appl. No.: 13/260,330

(22) PCT Filed: Apr. 23, 2009

(86) PCT No.: PCT/US2009/041507
§ 371 (c)(1),
(2), (4) Date: Sep. 25, 2011

(87) PCT Pub. No.: WO2010/123502
PCT Pub. Date: Oct. 28, 2010

(65) Prior Publication Data
US 2012/0021624 A1    Jan. 26, 2012

(51) Int. Cl.
*H01R 25/00* (2006.01)
(52) U.S. Cl.
USPC .............................. 439/638; 361/737; 439/61
(58) Field of Classification Search
USPC ........... 439/638, 61, 502, 76.1; 361/737, 796, 361/801
See application file for complete search history.

(56) References Cited

U.S. PATENT DOCUMENTS

| | | | | |
|---|---|---|---|---|
| 4,401,351 A * | 8/1983 | Record | ........................... | 439/61 |
| 5,038,308 A * | 8/1991 | Le et al. | ........................ | 361/796 |
| 5,440,755 A * | 8/1995 | Harwer et al. | ................. | 710/315 |
| 5,459,637 A * | 10/1995 | Ma et al. | ................... | 361/679.41 |
| 5,594,621 A * | 1/1997 | van Rumpt | ............... | 361/679.32 |
| 5,748,443 A * | 5/1998 | Flint et al. | ................. | 361/679.32 |
| 5,754,796 A * | 5/1998 | Wang et al. | ..................... | 710/301 |
| 5,765,008 A * | 6/1998 | Desai et al. | ..................... | 710/301 |
| 5,820,414 A * | 10/1998 | Omori | ........................... | 439/638 |
| 5,896,473 A * | 4/1999 | Kaspari | ........................... | 385/24 |
| 5,926,378 A * | 7/1999 | DeWitt et al. | ................. | 361/788 |
| 6,004,139 A * | 12/1999 | Dramstad et al. | ............... | 439/59 |
| 6,046,912 A * | 4/2000 | Leman | ........................... | 361/784 |
| 6,147,871 A * | 11/2000 | DeWitt et al. | ................. | 361/752 |
| 6,155,842 A * | 12/2000 | Baitz | ............................... | 439/61 |
| 6,325,636 B1 * | 12/2001 | Hipp et al. | ....................... | 439/61 |
| 6,363,450 B1 * | 3/2002 | Lash et al. | ..................... | 710/301 |
| 6,477,603 B1 * | 11/2002 | Locker et al. | ................. | 710/301 |
| 6,542,384 B1 * | 4/2003 | Radu et al. | ..................... | 361/818 |

(Continued)

FOREIGN PATENT DOCUMENTS

KR    200191756    8/2000
KR    202001007885    8/2001

OTHER PUBLICATIONS

ISA/KR, International Search Report dated Jan. 21, 2010, PCT/US2009/041507 filed Apr. 23, 2009.

(Continued)

*Primary Examiner* — Amy Cohen Johnson
*Assistant Examiner* — Vladimir Imas

(57) ABSTRACT

A system and method for adapting a peripheral expansion card to a peripheral expansion slot are disclosed herein. A first board of an expansion card adapter is configured to mate with an expansion card connector. A second board of the expansion card adapter is configured to mate with peripheral expansion card that is incompatible with the expansion card adapter.

14 Claims, 3 Drawing Sheets

(56) References Cited

U.S. PATENT DOCUMENTS

| | | | |
|---|---|---|---|
| 6,597,566 B1 * | 7/2003 | Phan .................. | 361/679.6 |
| 6,644,979 B2 * | 11/2003 | Huang ................ | 439/65 |
| 6,711,023 B2 * | 3/2004 | Yen .................... | 361/740 |
| 6,731,515 B2 * | 5/2004 | Rhoads ................ | 361/796 |
| 6,738,260 B2 * | 5/2004 | Sivertsen ............ | 361/740 |
| 6,747,878 B1 * | 6/2004 | Hipp et al. .......... | 361/801 |
| 6,757,748 B1 * | 6/2004 | Hipp .................. | 710/2 |
| 6,805,560 B1 * | 10/2004 | Budny et al. ........ | 439/65 |
| 6,848,913 B2 * | 2/2005 | Wang .................. | 439/65 |
| 6,985,967 B1 * | 1/2006 | Hipp .................. | 709/250 |
| 7,009,848 B2 * | 3/2006 | Ruckerbauer et al. ... | 361/785 |
| 7,075,797 B1 * | 7/2006 | Leonard et al. ...... | 361/803 |
| 7,234,971 B2 * | 6/2007 | Chou et al. .......... | 439/630 |
| 7,261,600 B2 * | 8/2007 | Park .................. | 439/638 |
| 7,359,216 B2 * | 4/2008 | Hall .................. | 361/796 |
| 7,394,652 B1 * | 7/2008 | Jochym et al. ........ | 361/679.33 |
| 7,468,884 B2 * | 12/2008 | Carr et al. .......... | 361/679.41 |
| 7,561,439 B2 * | 7/2009 | Orr et al. ............ | 361/796 |
| 7,602,611 B2 * | 10/2009 | Peng et al. .......... | 361/728 |
| 7,710,741 B1 * | 5/2010 | Kelleher et al. ...... | 361/803 |
| 7,742,291 B2 * | 6/2010 | Wu et al. ............ | 361/679.32 |
| 7,746,630 B2 * | 6/2010 | Tsai et al. .......... | 361/679.32 |
| 7,848,115 B2 * | 12/2010 | Casto et al. ........ | 361/788 |
| 8,051,210 B2 * | 11/2011 | Larson et al. ........ | 709/249 |
| 8,064,223 B2 * | 11/2011 | Tachikawa ............ | 361/807 |
| 8,199,515 B2 * | 6/2012 | Bandholz et al. ...... | 361/760 |
| 8,277,229 B2 * | 10/2012 | Chiu et al. .......... | 439/65 |
| 8,295,059 B1 * | 10/2012 | Conroy ................ | 361/796 |
| 2002/0072255 A1 | 6/2002 | Leman | |
| 2003/0046467 A1 | 3/2003 | Golka et al. | |
| 2006/0065721 A1 | 3/2006 | Addison et al. | |
| 2006/0242345 A1 | 10/2006 | Berl | |
| 2008/0183933 A1 * | 7/2008 | Peng et al. .......... | 710/302 |

OTHER PUBLICATIONS

Orbit Micro Corporation, "PCI Express X1 to PCI Express Mini interface adapter," 2006, Orbit Micro Corporation, 2 p. [Online] http://www.orbitmicro.com/global/pciexp.

Shanghai Aeneas Electgronic Co., Ltd.-Ricoh, "Mini PCI-E / PCI-E adapte," MP1 Series, Copyright 2002 Shanghai Aeneas Electronics Co., Ltd., 3 p. [Online] http://www.aeneas.com.

\* cited by examiner

EXPANSION CARD ADAPTER

RELATED PATENT DATA

CROSS-REFERENCE TO RELATED APPLICATION

This application claims priority to PCT Patent Application Serial No. PCT/US2009/041507, which was filed on Apr. 23, 2009 which is herein included by reference in its entirety for all purposes.

BACKGROUND

Over the years, various standards have been applied to permit connection of peripheral devices (i.e., peripheral expansion boards) to a computer mainboard. Peripheral expansion boards are available in a variety of form factors. Some peripheral expansion boards feature small form factors applicable to space constrained applications, such as notebook computers. Some peripheral expansion board form factors are targeted at desktop computers where more space is available to accommodate a larger form factor. A computer may include one or more peripheral expansion slots configured to accommodate a particular peripheral expansion board form factor.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

A computer system, for example a desktop computer, can include one or more peripheral expansion slots. Each peripheral expansion slot includes a connector through which signals of a peripheral expansion card "bus" are provided to a connected peripheral expansion board. A peripheral expansion slot may provide sufficient clearance to install a peripheral expansion board having a form factor intended for use in a particular expansion slot.

Unfortunately, as the size of computer packaging shrinks the number of useable peripheral expansion slots in a computer may also be reduced. In some cases, a computer may include a peripheral expansion slot with an operable electrical connection to the peripheral expansion bus, but obstructions may leave the expansion slot with inadequate clearance to support an expansion card of the form factor intended for use with the expansion slot connector. Embodiments of the present disclosure allow use of space constrained expansion slots through an adapter configured to mate with the expansion slot connector. The adapter provides for connection of a different form factor peripheral expansion card outside the space restricted expansion slot. In some embodiments, an adapter allows a PCI Express ("PCIe") mainboard expansion slot to accommodate a PCIe Mini Card positioned outside the slot. Thus, embodiments allow for computer expansion through use of peripheral expansion slots that would be otherwise inaccessible.

Figure 1:
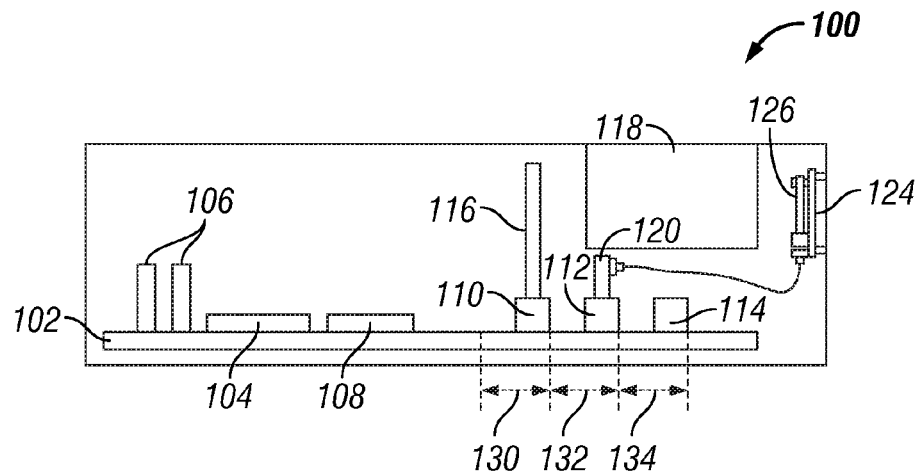
FIG. 1 shows an exemplary computer including an expansion slot adapter in accordance with various embodiments.

FIG. 1 shows an exemplary computer 100 that includes an expansion slot adapter in accordance with various embodiments. The exemplary computer 100 includes a mainboard 102. The mainboard 102 includes various components, for example, a processor 104, memory 106, and a chipset 108. The processor executes program instructions provided from a computer readable medium, such as memory 106. Embodiments of a processor can include execution units (e.g., integer, fixed point, floating point, etc.), instruction decoders, storage units (e.g., memory, registers, etc.), input/output sub-systems (e.g., bus interfaces), peripherals (e.g., timers, interrupt controllers, direct memory access controllers, etc.) and interconnecting buses.

The memory 106 provides data and program storage for the processor 104 and other computer 100 sub-systems. Exemplary memory technologies include various types of semiconductor random access memory, such as, dynamic random access memory, static random access memory, FLASH memory, etc.

The chipset 108 interfaces the processor 102 to various other computer 100 sub-systems. The chipset 108 may, for example, provide a graphics sub-system interface, a mass storage interface, a memory 106 interface, and/or another peripheral bus interface. In some embodiments of the chipset 108, the chipset includes a northbridge and southbridge contained in one or more packages. In some embodiments, the chipset 108 can be packaged with the processor 102.

The chipset 108 can also provide a peripheral expansion card bus interface. The computer 100 includes a number of expansion slots 130, 132, 134, i.e., areas within the computer 100 provided and/or reserved for installation of an expansion card. Each expansion slot includes an expansion slot connector 110, 112, 114 configured to couple an expansion card to the mainboard 102. The expansion slots 130, 132, 134 are internal to the computer 100, and accordingly are internal to a case or housing that surrounds the various components (e.g., mainboard 102) of the computer 100. The expansion slot 130, 132, 134 associated with each expansion slot connector 110, 112, 114, may be considered to extend horizontally from one edge of an expansion slot connector to the corresponding edge of a neighboring expansion card connector as shown in FIG. 1, or equivalent distance. However, this convention is adopted only as a matter of convenience, and in general, an expansion slot may extend only to point that does not interfere with a neighboring expansion slot.

Each expansion slot connector 110, 112, 114 can be connected to the chipset 108 by a set of conductors. The arrangement of the conductors depends on the nature of the peripheral expansion bus. In embodiments of a PCIe expansion bus, for example, each expansion slot connector 110, 112, 114 may be connected to the chipset 108 by a different set of data conductors (i.e., a star arrangement/switched architecture). In other types of expansion buses, the expansion slot connectors 110, 112, 114 may be connected to a set of shared data conductors (i.e., a parallel bus arrangement).

An expansion card 116 is installed in the expansion slot connector 110. The expansion card 116 may be, for example, a graphics adapter, a network adapter, etc. Expansion cards may be provided in various standard form factors, each form factor including board dimensions and connector types. For example, PCIe expansion cards configured for use in desktop computers may include card edge contacts for mating with a vertical PCIe connector 110 (e.g., Tyco Electronics, 1-1612163-1). The expansion slot 130 corresponding to expansion connector 110 provides adequate clearance to install the expansion card 116.

The expansion slots 132, 134 are obstructed expansion slots. Obstructed expansion slots do not provide adequate clearance to install a standard form factor expansion card, such as the expansion card 116 due to interference from/with other computer 100 components. For example, in the obstructed expansion slots 132, 134, an obstruction 118, which may be a computer power supply, mass storage device bay, etc., prevents installation of an expansion card generally dimensioned (e.g., expansion card 116) for use with the expansion slot connectors 112, 114.

The computer 100 includes an adapter that enables use of an obstructed expansion slot 132, 134. The adapter includes an adapter riserboard printed circuit board ("PCB") 120, installed in the expansion slot connector 112, and an adapter daughterboard PCB 124. The adapter daughterboard 124 can be placed in the computer 100 at a location outside of the obstructed expansion slot 132, where space is available to install the daughterboard 124. In at least some embodiments, the adapter daughterboard 124 is configured to mate with a reduced form factor expansion card 126, for example, a PCIe Mini Card. The PCIe Mini Card 126 advantageously incorporates the same PCIe electrical interface as a larger form factor PCIe expansion card (e.g., 116), therefore, no electrical or protocol format conversion is necessary between the expansion slot connector 112 and the PCIe Mini Card 126. Moreover, the smaller size of the PCIe Mini Card 126 (51×30 millimeters) increases flexibility in positioning the daughterboard 124. By including the expansion slot adapter, embodiments of the computer 100 are able to make use of the expansions slots 132, 134 to provide extended functionality through peripheral expansion cards.

Figure 2:
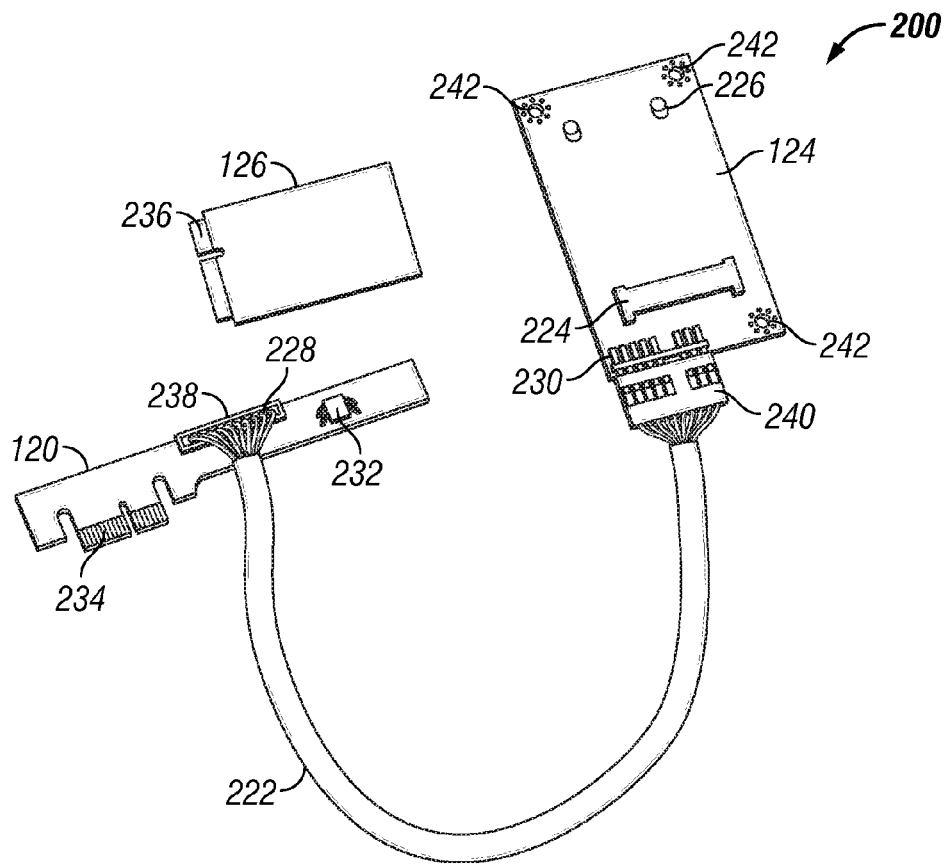
FIG. 2 shows an expansion slot adapter in accordance with various embodiments.

FIG. 2 shows an expansion slot adapter 200 in accordance with various embodiments. The adapter includes an adapter riserboard PCB 120, an adapter daughterboard PCB 124, and a set of conductors (e.g., a cable 222) that electrically connects the riserboard 120 and the daughterboard 124. Embodiments of the riserboard 120 can be configured to avoid and obstruction, for example, to reduce the clearance required above the expansion slot connector 112. In some embodiments, for example, the riserboard 120 may require a clearance of one centimeter or less above the expansion slot connector 112. The riserboard 120 includes a connector (e.g., the board edge contacts 234) configured to mate with the expansion slot connector 112, thus allowing peripheral bus signal exchange with the mainboard 102. Some embodiments of the riserboard 120 also includes a connector 228 configured to mate with a corresponding connector 238 of the cable 222. At least some embodiments of the riserboard 120 include driver and/or receiver circuitry 232 configured to regenerate expansion bus signals destined for and/or received from the daughterboard 124.

An embodiment of the daughterboard 124 includes a connector 224 configured to mate with a corresponding connector 236 of the expansion card (e.g., PCIe Mini Card 126 including 52 contacts). The PCIe Mini Card 126 is relatively small (i.e., 30×51 millimeters) allowing the daughterboard 124 to be located in a correspondingly small area of the computer 100 chassis. Embodiments need not use or even transfer between the riserboard 120 and the daughterboard 124 all of the signals specified for the PCIe Mini Card connector 236. For example, some embodiments may provide only one PCIe lane and power. Some embodiments of the daughterboard 124 also include a connector 230 configured to mate with a corresponding connector 240 of the cable 222. Embodiments can include structures such as the mounting holes 242 for mounting the daughterboard 124 in the computer 100, and mounting posts 226 for mounting the expansion board 126 on the daughterboard 124.

Figure 3:
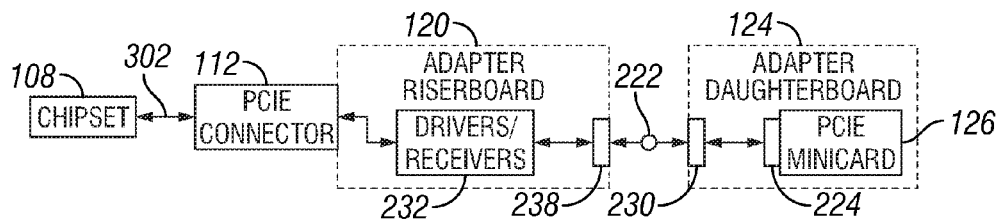
FIG. 3 shows a block diagram of a expansion slot adapter in accordance with various embodiments.

FIG. 3 shows an exemplary block diagram of the expansion slot adapter 200 in accordance with various embodiments. The chipset 108 provides various expansion bus signals 302 that are driven via mainboard 102 conductors to the expansion slot connector 112 (e.g., a PCIe connector). In a PCIe embodiment, the signals 302 include a set of differential signals that serially transfer data between the chipset 108 and an adapter card.

The clearance associated with the expansion slot connector 112 is insufficient to install an expansion board 116. To make use of the expansion slot 132, an adapter riserboard 120 configured for installation with reduced clearance is installed in the expansion slot connector 112. The PCIe signals 302 are provided to the adapter riserboard 120 through the PCIe expansion slot connector 112. Some embodiments of the adapter riserboard 120 include drivers/receivers 232 that regenerate PCIe signals destined for and/or received from the adapter daughterboard 124. In some embodiments, PCIe signals (regenerated in some embodiments) are provided to a cable 222, or other conductive medium, through a connector 238.

The adapter daughterboard 124 receives the PCIe signals transferred via the cable 222. In some embodiments, the daughterboard 124 includes a connector 230 that couples the cable 222 to the daughterboard 124. A expansion board (e.g., PCIe Mini Card 126) receives the PCIe signals via connector 224 on the adapter daughterboard 124. The PCIe Mini Card 126 uses the same electrical specifications and protocols provided by mainboard 102 PCIe signals 302 so no conversions are required. PCIe signals provided from the daughterboard 124 to the chipset 108 follow a reverse flow from that described above.

Figure 4:
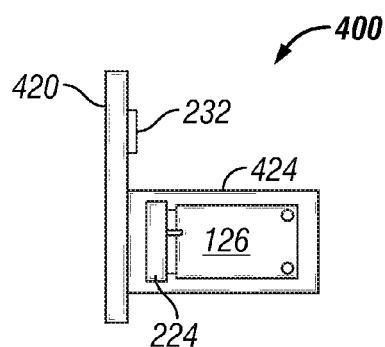
FIG. 4 shows a top view of an expansion slot adapter in accordance with various embodiments.

FIG. 4 shows a top view of an expansion slot adapter 400 in accordance with various embodiments. The adapter includes an adapter riserboard PCB 420 and an adapter daughterboard PCB 424. Like the riserboard 120, the riserboard 420 includes a connector 234, and may include drivers/receivers 232. The connector 234 provides an electrical connection to the expansion slot connector 114. The drivers/receivers 232 regenerate the expansion bus signals.

The adapter daughterboard 424 includes an expansion card connector 224 (e.g., a PCIe Mini Card connector) for mating an expansion card (e.g., a PCIe Mini Card 126) to the daughterboard 424.

The daughterboard 424 may be rigidly connected to the riserboard 420 by a eutectic connection (e.g., solder), by connectors, by press fitting, or by another connecting method.

Figure 5:
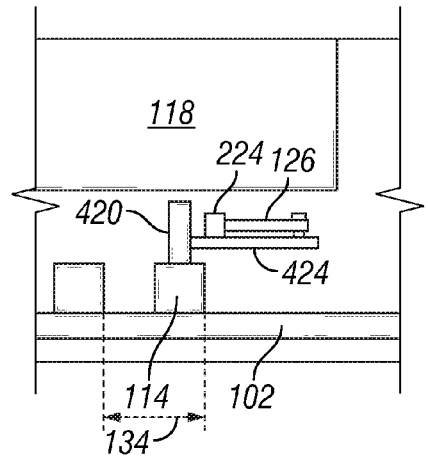
FIG. 5 shows a computer system that includes an expansion slot adapter in accordance with various embodiments.

FIG. 5 shows a computer system that includes an expansion slot adapter 400 in accordance with various embodiments. The space available in the expansion slot 134 is restricted by the obstruction 118 (e.g., the power supply of the computer 100). To make use of the obstructed expansion slot 134, the adapter 400 is employed. The adapter riserboard 420 is installed in the expansion slot connector 114, and a PCIe Mini Card 126 providing a desired function is installed on the daughterboard 424. The daughterboard 424 and the PCIe Mini Card 126 are positioned, at least in part, outside the space provided for the expansion slot 134. In some embodiments, the daughterboard 424 may be mounted substantially perpendicular to the riserboard 420, though embodiments may use any mounting angle that does not interfere with computer 100 operation.

Figure 6:
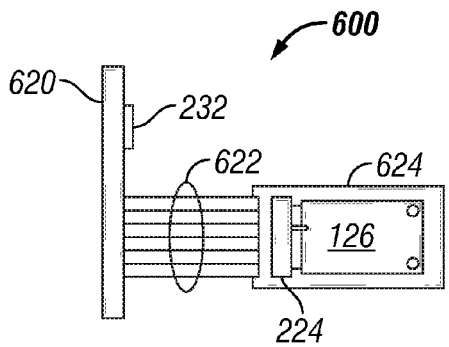
FIG. 6 shows a top view of an expansion slot adapter in accordance with various embodiments.

FIG. 6 shows a top view of an expansion slot adapter 600 in accordance with various embodiments. The adapter 600 includes an adapter riserboard PCB 620 and an adapter daughterboard PCB 624. Like the riserboard 120, the riserboard 620 includes a connector 234, and may include drivers/receivers 232. The connector 234 provides an electrical connection to the expansion slot connector 114. The drivers/receivers 232 regenerate the expansion bus signals.

The adapter daughterboard 624 includes an expansion card connector 224 (e.g., a PCIe Mini Card connector) for mating an expansion card (e.g., PCIe Mini Card 126) to the daughterboard 624.

The daughterboard 624 may be flexibly connected to the riserboard 620 by a set of pliable flat conductors 622, for example, a ribbon cable or a flexible circuit. The flat conductors 622 may be connected to the daughterboard 624 and the riserboard 620 by solder, connectors or any other connection method.

Figure 7:
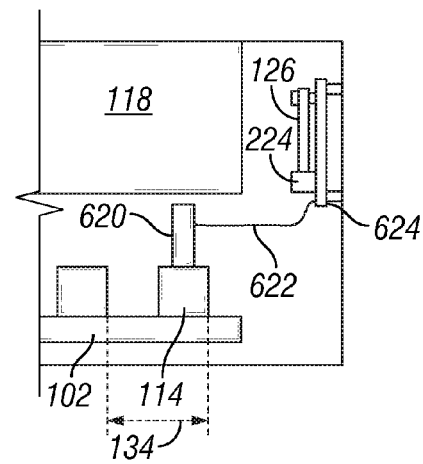
FIG. 7 shows a computer system that includes an expansion slot adapter in accordance with various embodiments.

FIG. 7 shows a computer system 100 that includes an expansion slot adapter 600 in accordance with various embodiments. The space available in the expansion slot 134 is restricted by the obstruction 118 (e.g., the power supply of the computer 100). To make use of the obstructed expansion slot 134, the adapter 600 is employed. The adapter riserboard 620 is installed in the expansion slot connector 114, and a PCIe Mini Card 126 providing a desired function is installed on the daughterboard 624. The daughterboard 624 and the PCIe Mini Card 126 are positioned at a location in the computer 100 chassis where adequate space is available.

Figure 8:
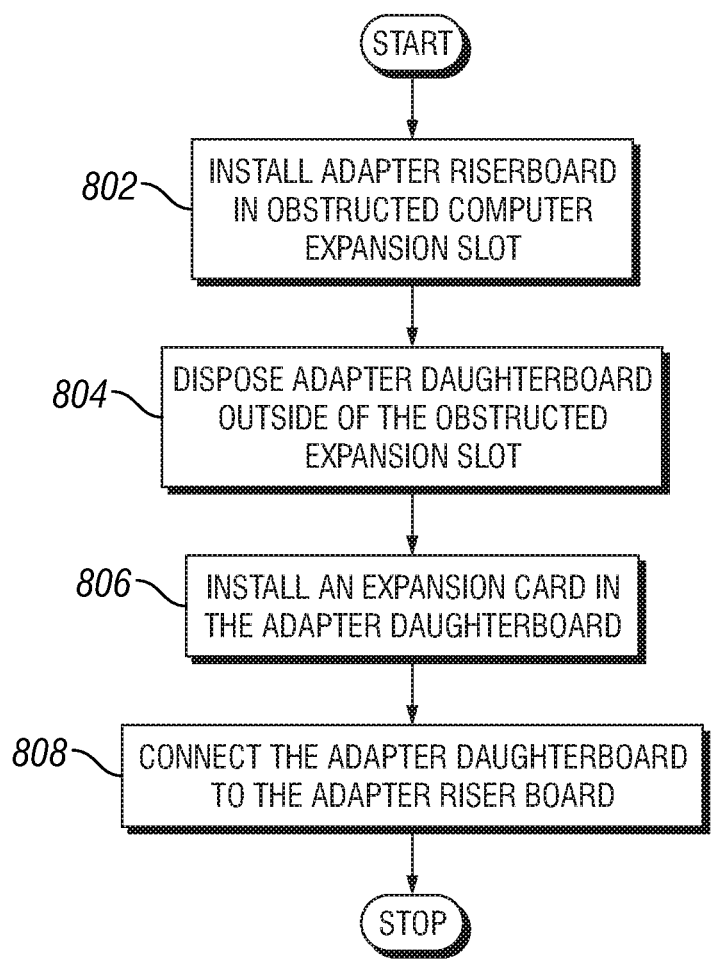
FIG. 8 shows a flow diagram for a method using an expansion slot adapter to access an obstructed expansion slot in accordance with various embodiments.

FIG. 8 shows a flow diagram for a method for using an expansion slot adapter (e.g., 200) to access an obstructed expansion slot 132 in accordance with various embodiments. Though depicted sequentially as a matter of convenience, at least some of the actions shown can be performed in a different order and/or performed in parallel. Additionally, some embodiments may perform only some of the actions shown.

In block 802, a computer, for example, a desktop computer 100 includes an expansion slot 132 that is obstructed and therefore unable to provide a connection to at least some computer expansion cards 116 designed for use with the expansion slot connector 112 (e.g., a PCIe connector). To allow use of the expansion slot 132, an expansion slot adapter 200 may be employed. The riserboard 120 of the adapter is installed in the obstructed computer expansion slot 132. The riserboard 120 is dimensioned to avoid the obstruction 118, and is configured to be mated to the expansion slot connector 112.

In block 804, an adapter daughterboard 124 of the adapter 200 is disposed in the computer chassis at a location outside of the obstructed expansion slot 132. The daughterboard 124 may be configured to receive an expansion card 126 that is compatible with the electrical signals and protocols provided through the expansion slot connector 112, but physically incompatible with the expansion card slot 132 and the expansion card slot connector 112. For example, the daughterboard 124 may be configured to accept a PCIe Mini Card 126.

In block 806, an expansion card 126 is installed in the adapter daughterboard 124.

In block 808, the adapter daughterboard 124 is connected to the adapter riserboard 120. In some embodiments, a set of conductors, such as a cable 222, etc., may be used to connect the adapter boards 120, 124.

The above discussion is meant to be illustrative of the principles and various embodiments of the present invention. Numerous variations and modifications will become apparent to those skilled in the art once the above disclosure is fully appreciated. For example, while PCIe has been used to illustrate various embodiments, other peripheral interface bus standards may also be used. Furthermore, embodiments are not limited to any particular riserboard, adapter daughterboard, or expansion card form factors. It is intended that the following cairns be interpreted to embrace all such variations and modifications.

What is claimed is:

1. A computer system, comprising:
an internal expansion slot comprising an expansion slot connector configured to mate with a first type of peripheral expansion card;
an expansion card adapter configured to mate with the expansion slot connector and to provide an interface to a second type of peripheral expansion card not configured to mate with the expansion slot connector;
wherein the expansion card adapter is configured to avoid an obstruction that prevents installation of the first type of peripheral expansion card in the internal expansion slot;
wherein a portion of the expansion card adapter that provides the interface to the second type of peripheral expansion card is disposed outside the expansion slot.

2. The computer system of claim 1, wherein the expansion card adapter comprises:
a first connector configured to mate with the expansion slot connector; and
a second connector configured to mate with the second type of peripheral expansion card;

wherein the first connector is disposed on a first circuit board and the second connector is disposed on a second circuit board.

3. The computer system of claim 2, wherein the second circuit board is configured to be flexibly connected to the first circuit board by a set of flexible conductors.

4. The computer system of claim 2, wherein the second circuit board is configured to be affixed to a chassis of the computer system.

5. The computer system of claim 2, wherein the second circuit board is configured to be rigidly mounted directly to the first circuit board.

6. The computer system of claim 1, wherein the expansion card adapter comprises driver circuitry configured to drive signals between the expansion slot connector and the second type of peripheral expansion card.

7. The computer system of claim 1, further comprising a peripheral expansion card of the second type coupled to the expansion card adapter, wherein only a portion of the signals defined in an input/output specification for the second expansion card type are provided to the peripheral expansion card.

8. A peripheral expansion card adapter, comprising:
a first printed circuit board ("PCB") configured to mate with a first type of peripheral expansion card connector; and
a second PCB comprising a second type of peripheral expansion card connector configured to mate with a peripheral expansion card that is physically incompatible with the first type of peripheral expansion card connector;
wherein the first PCB is configured to avoid an obstruction that prevents installation of peripheral expansion cards in the first type of peripheral expansion card connector.

9. The peripheral expansion card adapter of claim 8, further comprising a cable that flexibly couples the first PCB to the second PCB.

10. The peripheral expansion card adapter of claim 8, wherein the second PCB is rigidly coupled directly to the first PCB.

11. The peripheral expansion card adapter of claim 8, further comprising driver circuitry that regenerates signals transmitted between the first PCB and the second PCB.

12. The peripheral expansion card adapter claim 8, wherein the second PCB is configured to be mounted remotely from a peripheral expansion slot in which the first PCB is installed.

13. A method for utilizing an obstructed expansion slot of a computer, comprising:
installing an adapter riser board configured to avoid an obstruction in the obstructed expansion slot, the adapter riser board is configured to mate with a connector of the expansion slot; and
connecting an adapter daughter board to the adapter riser board, the adapter daughter board is configured to receive a peripheral expansion card having a physical form that is incompatible with the connector of the expansion slot.

14. The method of claim 13, further comprising disposing the adapter daughter board within the computer at a location outside of the obstructed slot, and installing a peripheral expansion card on the adapter daughter board.

* * * * *

UNITED STATES PATENT AND TRADEMARK OFFICE
CERTIFICATE OF CORRECTION

PATENT NO. : 8,585,442 B2  
APPLICATION NO. : 13/260330  
DATED : November 19, 2013  
INVENTOR(S) : George Tuma et al.

Page 1 of 1

It is certified that error appears in the above-identified patent and that said Letters Patent is hereby corrected as shown below:

In the Claims:

In column 8, line 12, in Claim 12, after "adapter" insert -- of --.

Signed and Sealed this  
Twenty-fifth Day of February, 2014

Michelle K. Lee  
*Deputy Director of the United States Patent and Trademark Office*